United States Patent [19]

Kawamura et al.

[11] 4,453,379

[45] Jun. 12, 1984

[54] EXHAUST GAS RECIRCULATION SYSTEM FOR AN INTERNAL COMBUSTION ENGINE

[75] Inventors: Yoshihisa Kawamura; Kichihiko Dozono, both of Yokosuka, Japan

[73] Assignee: Nissan Motor Company, Limited, Japan

[21] Appl. No.: 460,563

[22] Filed: Jan. 24, 1983

[30] Foreign Application Priority Data

Mar. 2, 1982 [JP] Japan .................................. 57-32868

[51] Int. Cl.³ .......................................... F02M 25/06
[52] U.S. Cl. ...................................... 60/278; 123/569; 123/571
[58] Field of Search .................. 123/571, 569; 60/278, 60/279, 311

[56] References Cited

U.S. PATENT DOCUMENTS

| | | | |
|---|---|---|---|
| 4,185,604 | 1/1980 | Nagaishi et al. | 123/571 |
| 4,211,075 | 7/1980 | Ludecke et al. | 60/311 |
| 4,300,516 | 11/1981 | Hayakawa | 123/571 |
| 4,318,385 | 3/1982 | Yamaguchi | 123/571 |
| 4,378,776 | 4/1983 | Nishimori | 123/571 |
| 4,378,777 | 4/1983 | Iida et al. | 123/571 |

*Primary Examiner*—Wendell E. Burns
*Attorney, Agent, or Firm*—Lowe, King, Price & Becker

[57] ABSTRACT

An exhaust gas recirculation system is applied to an internal combustion engine having a combustion chamber and an exhaust passage conducting exhaust gas from the combustion chamber to the atmosphere. The system includes a first mechanism provided to recirculate the exhaust gas through the combustion chamber. A second mechanism is associated with the first mechanism to adjustably determine the percentage of the exhaust gas recirculated. A sensor detects the average pressure in the exhaust passage. In response to the detected exhaust pressure, a third mechanism controls the second mechanism in such a manner that the percentage of the exhaust gas recirculated is independent of the variations in the average pressure in the exhaust passage.

10 Claims, 8 Drawing Figures

FIG.4

BASIC DESIRED VALUES
OF DUTY CYCLE DEø
OF CONTROL SIGNAL S1

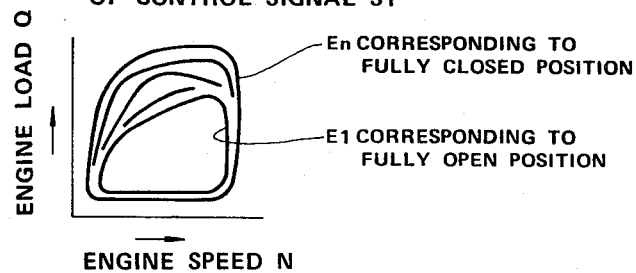

En CORRESPONDING TO FULLY CLOSED POSITION

E1 CORRESPONDING TO FULLY OPEN POSITION

ENGINE SPEED N

FIG.5

REFERENCE VALUES Po
FOR EXHAUST PRESSURE

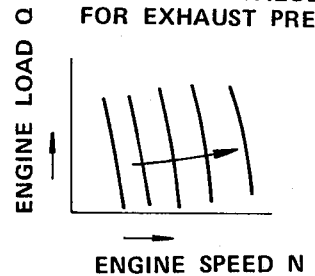

ENGINE SPEED N

FIG.6

BASIC DESIRED VALUES
OF DUTY CYCLE DTø
OF CONTROL SIGNAL S2

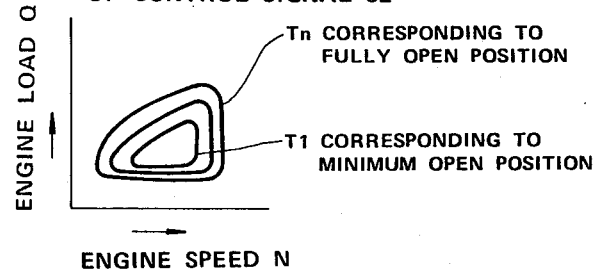

Tn CORRESPONDING TO FULLY OPEN POSITION

T1 CORRESPONDING TO MINIMUM OPEN POSITION

ENGINE SPEED N

EXHAUST GAS RECIRCULATION SYSTEM FOR AN INTERNAL COMBUSTION ENGINE

BACKGROUND OF THE INVENTION

1. Field of the Invention

This invention relates to an exhaust gas recirculation system for an internal combustion engine, such as a diesel engine.

2. Description of the Prior Art

It is known to provide an internal combustion engine with an exhaust gas recirculation (EGR) system to reduce the harmful emissions of oxides of nitrogen (NOx). The EGR system includes an EGR passage interconnecting the engine air intake passage and the engine exhaust passage. An EGR control valve is disposed in the EGR passage to controllably enable and disable the EGR, or to control the percentage of exhaust gas recirculated.

In the case of a diesel engine, the engine exhaust contains a significant amount of carbon soot or smoke, and the soot or smoke gradually accumulates in the exhaust passage as the engine ages. The soot or smoke accumulation usually causes the average pressure in the exhaust passage to increase. The increase of the exhaust passage pressure results in a gradual change in the percentage of exhaust gas recirculated. In this way, the characteristics of EGR change as the engine ages.

SUMMARY OF THE INVENTION

It is an object of this invention to provide an exhaust gas recirculation system of an internal combustion engine, such as a diesel engine, which is insensitive to variations in the average exhaust passage pressures.

In accordance with this invention, an exhaust gas recirculation system is applied to an internal combustion engine having a combustion chamber and an exhaust passage conducting exhaust gas from the combustion chamber to the atmosphere. The system includes a first mechanism provided to recirculate the exhaust gas through the combustion chamber. A second mechanism is associated with the first mechanism to controllably determine the percentage of the exhaust gas recirculated. A sensor detects the average pressure in the exhaust passage. In response to the detected exhaust pressure, a third mechanism controls the second mechanism in such a manner that the percentage of the exhaust gas recirculated is independent of variations in the average pressure in the exhaust passage.

The above and other objects, features and advantages of this invention will be apparent from the following description of preferred embodiments thereof, taken in conjunction with the drawings.

BRIEF DESCRIPTION OF THE DRAWINGS

FIG. 4 is a diagram showing the relation of the basic desired values of the first control signal duty cycle which determines the degree of opening of the EGR valve in FIG. 1, to the engine speed and the engine load;

FIG. 5 is a diagram showing the relation of the reference values for the exhaust passage pressure to the engine speed and the engine load;

FIG. 6 is a diagram showing the relation of the basic desired values of the second control signal duty cycle which determines the degree of opening of the throttle valve in FIG. 1, to the engine speed and the engine load;

DESCRIPTION OF THE PREFERRED EMBODIMENTS

Figure 1:
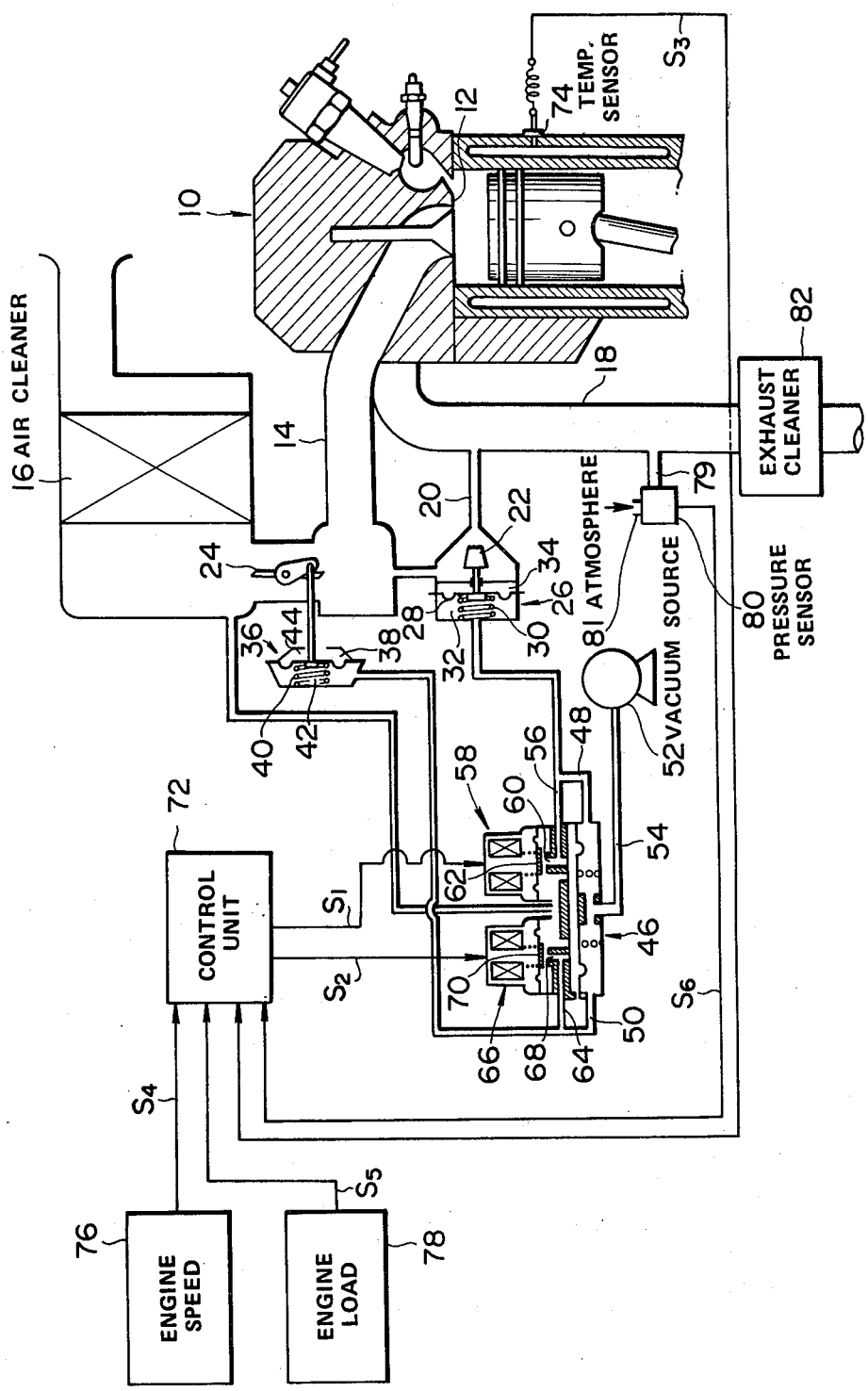
FIG. 1 is a diagram of a diesel engine and associated systems including an exhaust gas recirculation system according to a first embodiment of this invention.

Referring to FIG. 1, a diesel engine 10 has combustion chambers 12 and an air intake passage 14 leading to the combustion chambers 12 to conduct fresh air thereto. An air cleaner 16 is installed in the intake passage 14 to remove dirt and other contaminants from the air conducted to the combustion chambers 12. An exhaust passage 18 extends from the combustion chambers 12 to vent the exhaust gas from the combustion chambers 12 to the atmosphere.

An exhaust gas recirculation (EGR) passage 20 connects the exhaust passage 18 and the intake passage 14 downstream of the air cleaner 16 to enable exhaust gas recirculation through the combustion chambers 12 via the exhaust passage 18, the EGR passage 20, and the intake passage 14. An EGR control valve 22 is disposed in the EGR passage 20 in such a manner as to be capable of adjusting the effective cross-sectional area of the EGR passage 20 and blocking the EGR passage 20. As the EGR valve 22 increases the effective cross-sectional area of the EGR passage 20 and thus the degree of opening of the EGR valve 22 increases, the percentage of exhaust gas recirculated increases.

A throttle valve 24 is disposed in the intake passage 14 downstream of the air cleaner 16 but upstream of the connection with the EGR passage 20. The throttle valve 24 is intended to obstruct the supply of fresh air to the combustion chambers 12 and facilitate EGR instead. Basically, as the throttle valve 24 closes, the rate of fresh air supply to the combustion chambers 12 decreases while the rate of EGR increases.

A vacuum actuator 26 is provided to actuate the EGR valve 22. The actuator 26 has a casing, a diaphragm 28, and a spring 30. The diaphragm 28 separates the interior of the casing into a working chamber 32 and a reference chamber 34. The spring 30 located in the working chamber 32 seats between the casing and the diaphragm 28 to bias the diaphragm 28. The diaphragm 28 is linked to the EGR valve 22 so that displacement of the diaphragm 28 determines the position of the EGR valve 22. The reference chamber 34 is supplied with atmosphere via an opening through the casing. As the pressure in the working chamber 34 drops, the diaphragm 28 is displaced against the force of the spring 30 in the direction of opening the EGR valve 22. As the pressure in the working chamber 34 rises, the diaphragm 28 is displaced by the force of the spring 30 in the direction of closing the EGR valve 22.

Another vacuum actuator 36 is provided to actuate the throttle valve 24. The actuator 36 has a casing, a diaphragm 38, and a spring 40. The diaphragm 38 separates the interior of the casing into a working chamber 42 and a reference chamber 44. The spring 40 located in the working chamber 42 seats between the casing and the diaphragm 38 to bias the diaphragm 38. The throttle valve 24 is attached to the diaphragm 38 so that the position of the throttle valve 24 depends on displacement of the diaphragm 38. The reference chamber 44 is supplied with atmosphere via an opening through the casing. As the pressure in the working chamber 42 drops, the diaphragm 38 is displaced against the force of the spring 40 in the direction of closing the throttle valve 24. As the pressure in the working chamber 42 rises, the diaphragm 38 is displaced by the force of the spring 40 in the direction of opening the throttle valve 24.

A pressure regulating valve 46 communicates with the working chambers 32 and 42 via vacuum passages 48 and 50, respectively. The regulating valve 46 also communicates with a vacuum source 52, such as an engine-driven vacuum pump, via another vacuum passage 54. The regulating valve 46 and the vacuum source 52 cooperate to generate a constant vacuum, which is supplied via the regulating valve 46 to the vacuum passage 48 and 50. The connection of the vacuum passage 48 to the regulating valve 46 is isolated from the connection of the vacuum passage 50 to the regulating valve 46 so that the vacuum passages 48 and 50 are wholly independent.

One end of an air supply passage 56 is connected to the intake passage 14 upstream of the throttle valve 24 but downstream of the air cleaner 16. The other end of the passage 56 is connected to the vacuum passage 48. An electrically-driven or electromagnetic valve 58 is arranged in the air supply passage 56 to selectively block and open the passage 56. Specifically, the electromagnetic valve 58 includes a valve aperture 60 constituting part of the passage 56, and a valve member 62 for selectively blocking and opening the aperture 60. Energizing the electromagnetic valve 58 causes the valve member 62 to open the valve aperture 60 and thus the air supply passage 56. De-energizing the electromagnetic valve 58 causes the valve member 62 to block the valve aperture 60 and thus the air supply passage 56.

One end of another air supply passage 64 is connected to the intake passage 14 upstream of the throttle valve 24 but downstream of the air cleaner 16. The other end of the passage 56 is connected to the vacuum passage 50. An electrically-driven or electromagnetic valve 66 is arranged in the air supply passage 64 to selectively block and open the passage 64. Specifically, the electromagnetic valve 66 includes a valve aperture 68 constituting part of the passage 64, and a valve member 70 for selectively blocking and opening the aperture 68. Energizing the electromagnetic valve 66 causes the valve member 70 to open the valve aperture 68 and thus the air supply passage 64. De-energizing the electromagnetic valve 66 causes the valve member 70 to block the valve aperture 68 and thus the air supply passage 64. The air supply passages 56 and 64 upstream of the electromagnetic valves 58 and 66 consist of a common passageway.

A control unit 72 is electrically connected to the electromagnetic valves 58 and 66 to feed control signals $S_1$ and $S_2$ thereto, respectively. The control signals $S_1$ and $S_2$ are in the form of pulse trains, the high levels of which energize the respective electromagnetic valves 58 and 66 and the low levels of which de-energize the respective electromagnetic valves 58 and 66. As a result, while the control signals $S_1$ and $S_2$ are high, the electromagnetic valves 58 and 66 open the air supply passages 56 and 64, respectively. While the control signals $S_1$ and $S_2$ are low, the electromagnetic valves 58 and 66 block the air supply passages 56 and 64, respectively.

When the electromagnetic valve 58 blocks the air supply passage 56, the pressure in the working chamber 34 can drop, since the regulating valve applies the regulated vacuum to the working chamber 34 via the vacuum passage 48. When the electromagnetic valve 58 opens the air supply passage 56, air is permitted to enter the vacuum passage 48 and the working chamber 34 from the intake passage 14 via the air supply passage 56, enabling the pressure in the working chamber 34 to rise. The frequency of the control signal $S_1$, that is, the frequency of switching on and off the electromagnetic valve 58, is chosen such that the pressure in the working chamber 34 is stably held at a level which depends on the duty cycle of the control signal $S_1$. In this case, the pressure in the working chamber 34 can vary throughout the range from atmospheric pressure to the vacuum pressure at the regulating valve 46. The frequency of the control signal $S_1$ is preferably a constant value in the range of from 30 Hz to 50 Hz. Since the pressure in the working chamber 34 determines the degree of opening of the EGR valve 22, the duty cycle of the control signal $S_1$ defines the degree of opening of the EGR valve 22. The control unit 72 controls the degree of opening of the EGR valve 22 by adjusting the duty cycle of the control signal $S_1$. The duty cycle range of the control signal $S_1$ and the vacuum actuator 26 are designed so that the EGR valve 22 can block the EGR passage 20 completely and can open it fully.

When the electromagnetic valve 66 blocks the air supply passage 64, the pressure in the working chamber 42 can drop, since the regulating valve 46 applies the regulated vacuum to the working chamber 42 via the vacuum passage 50. When the electromagnetic valve 66 opens the air supply passage 64, air is permitted to enter the vacuum passage 64 and the working chamber 42 from the intake passage 14 via the air supply passage 64, enabling the pressure in the working chamber 42 to rise. The frequency of the control signal $S_2$, that is, the frequency of switching on and off the electromagnetic valve 66, is chosen such that the pressure in the working chamber 42 is stably held at a level which depends on the duty cycle of the control signal $S_2$. In this case, the pressure in the working chamber 42 can vary throughout the range from atmospheric pressure to the vacuum pressure at the regulating valve 46. The frequency of the control signal $S_2$ is preferably a constant value in the range of from 30 Hz to 50 Hz. Since the pressure in the working chamber 42 determines the position of the throttle valve 24, the duty cycle of the control signal $S_2$ defines the position of the throttle valve 24. The control unit 72 controls the position of the throttle valve 24 by adjusting the duty cycle of the control signal $S_2$. The duty cycle range of the control signal $S_2$ and the vacuum actuator 36 are designed so that the position of the throttle valve 24 can vary from the possible fully open condition to a predetermined closed condition. When the throttle valve 24 is in the fully open position, the throttle valve 24 offers essentially no resistance to the fresh air supply to the combustion chambers 12 via the intake passage 14. When the throttle valve 24 is in the predetermined closed position, the throttle valve 24 allows a minimal sufficient fresh air supply to the combustion chambers 12 via the intake passage 14.

A temperature sensor 74 is provided to detect the temperature of the engine 10, preferably the temperature of engine coolant. The temperature sensor 74 includes the series combination of a thermistor, a resistor, and a constant voltage source. The thermistor is exposed to the engine coolant so that the voltage across the thermistor varies with the temperature of the engine coolant. The temperature sensor 74 outputs the voltage across the thermistor as a signal $S_3$ indicative of the engine temperature.

An engine speed sensor 76 is provided to detect the rotational speed of the engine 10. The speed sensor 76 includes the combination of a toothed disc and a magnetic pickup. The toothed disc is mounted on the camshaft or the crankshaft of the engine 10 to rotate together therewith. The magnetic pickup is fixedly located near the toothed disc so that an alternating voltage develops across the magnetic pickup as the toothed disc rotates. In this case, the frequency of the alternating voltage across the magnetic pickup is proportional to the engine rotational speed. The speed sensor 76 also includes a frequency detector, whose input terminal is connected across the magnetic pickup to receive the alternating voltage across the magnetic pickup. The frequency detector monitors the frequency of the alternating voltage across the magnetic pickup and outputs a digital signal $S_4$ indicative of the frequency of the alternating voltage and thus the engine rotational speed.

An engine load sensor 78 is provided to deduce the load on the engine 10 by sensing the power required of the engine 10 or the fuel quantity supplied to the combustion chambers 12 during each fuel injection stroke. The load sensor 78 includes a potentiometer, which is actuated by the accelerator pedal (not shown) of the engine 10 so that the displacement of the potentiometer depends on the position of the accelerator pedal. The potentiometer outputs a voltage signal $S_5$ whose level depends on the position of the accelerator pedal, that is, the power required of the engine 10.

The potentiometer of the load sensor 78 may be linked to the fuel injection quantity adjusting device in a fuel injection pump (not shown). The adjusting device controls the fuel quantity supplied to the combustion chambers 12 during each fuel injection stroke in a well-known manner. The displacement of the potentiometer depends on the position of the fuel injection quantity adjusting device, so that the potentiometer outputs a voltage signal $S_5$ whose level depends on the fuel quantity supplied to the combustion chambers 12 during each fuel injection stroke.

A pressure sensor 80 is provided to detect the pressure in the exhaust passage 18. The pressure sensor 80 consists of a pressure-to-voltage transducer, which has a pressure-responsive element subjected at different positions to the pressure in the exhaust passage 18 and to atmospheric pressure to respond to the difference therebetween. The supply of the pressure in the exhaust passage 18 to the pressure sensor 80 is achieved by a short passage 79 connecting the sensor 80 and the exhaust passage 18 downstream of the junction with the EGR passage 20. The supply of the atmospheric pressure to the pressure sensor 80 is achieved by an opening 81 through which the sensor 80 communicates with the atmosphere. The transducer outputs a voltage signal $S_6$ whose level depends on the difference between the pressure in the exhaust passage 18 and the atmospheric pressure. The transducer is designed so as to sense the average or mean level obtained by smoothing the pulsating pressure in the exhaust passage 18. The position of the pressure sensor 80 with respect to the exhaust passage 18 is shown to be downstream of the junction of the exhaust passage 18 and the EGR passage 20, but may also be upstream of the junction.

The control unit 72 is connected to the sensors 74, 76, 78, and 80 to receive the respective signals $S_3$, $S_4$, $S_5$, and $S_6$ therefrom. The control unit 72 determines the duty cycles of the control signals $S_1$ and $S_2$ in response to the signals $S_3$, $S_4$, $S_5$, and $S_6$, in order to control the percentage of the exhaust gas recirculated in accordance with the operating conditions of the engine 10.

An exhaust cleaner 82 is installed in the exhaust passage 18 downstream of the junction with the EGR passage 20 and that with the passage 79 to remove carbon soot or smoke from the exhaust flowing through the exhaust cleaner 82 after having been emitted from the combustion chambers 12 before being discharged into the atmosphere. Thus, the pressure sensor 80 detects the pressure in the exhaust passage 18 upstream of the exhaust cleaner 82.

Figure 2:
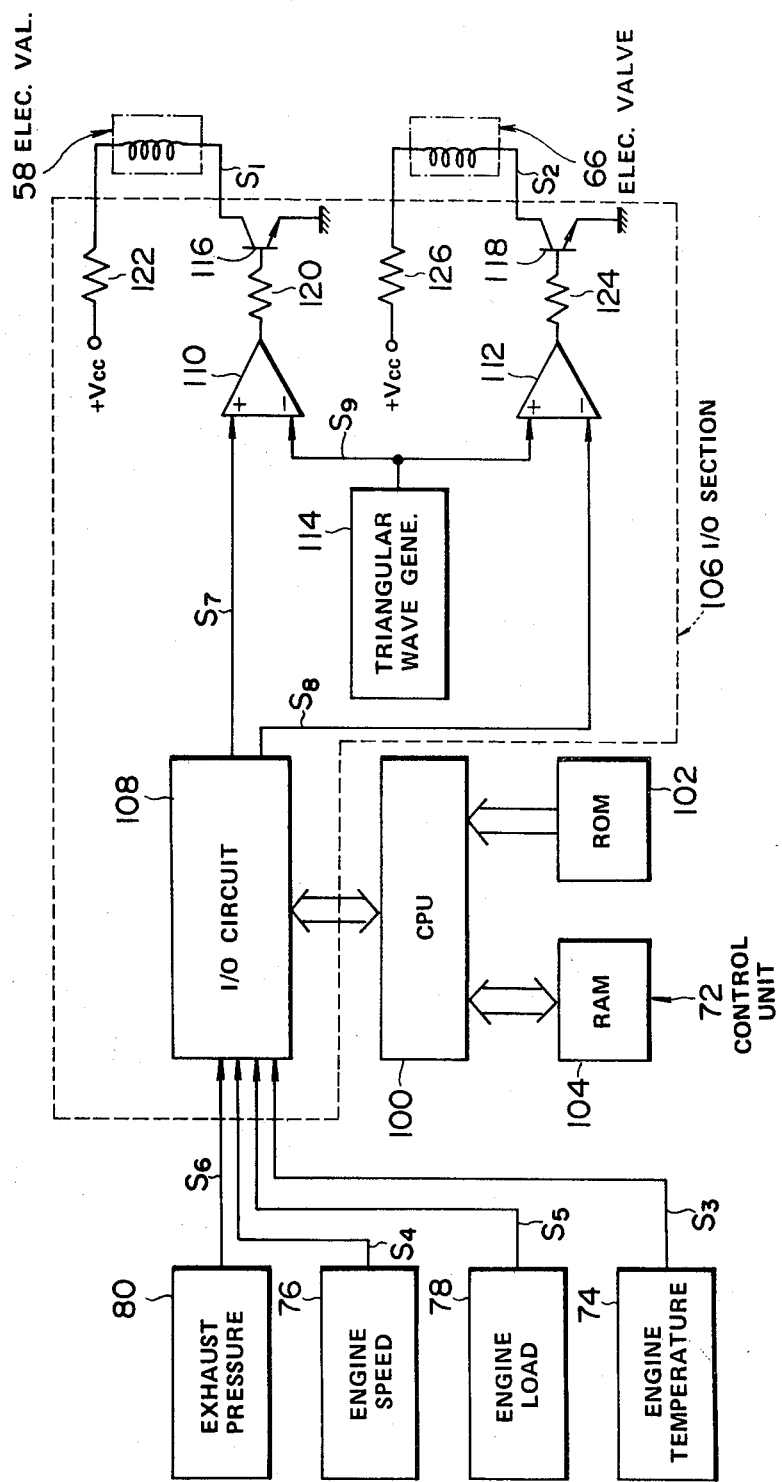
FIG. 2 is a diagram of the control unit and the associated elements of FIG. 1.

As shown in FIG. 2, the control unit 72 consists of a central processing unit (CPU) 100, a read-only memory (ROM) 102, a read/write or random-access memory (RAM) 104, and an input/output (I/O) section 106. The I/O section 106 includes an I/O circuit 108. The central processing unit 100 is connected to the memories 102 and 104, and the I/O circuit 108 and constitutes a digital microcomputer system in conjunction therewith.

The I/O circuit 108 is connected to the sensors 74, 76, 78, and 80 to receive the signals $S_3$, $S_4$, $S_5$, and $S_6$ therefrom. The I/O circuit 108 includes analog-to-digital (A/D) converters, which transform the analog signals $S_3$, $S_5$, and $S_6$ into corresponding digital signals so that the central processing unit 100 can handle the data from the signals $S_3$, $S_5$, and $S_6$. The central processing unit 100 receives the digital signal $S_4$ as it is. The I/O circuit 108 outputs voltage signals $S_7$ and $S_8$, whose levels determine the respective duty cycles of the control signals $S_1$ and $S_2$.

The I/O section 106 includes comparators 110 and 112, and a generator 114 outputting a constant-frequency, triangular-wave signal, that is, a dither signal $S_9$. The first input terminals of the comparators 110 and 112 are connected to the output terminal of the generator 114 to receive the triangular-wave signal $S_9$ therefrom. The second input terminal of the comparator 110 is connected to the I/O circuit 108 to receive the voltage signal $S_7$ therefrom. The second input terminal of the comparator 112 is connected to the I/O circuit 108 to receive the voltage signal $S_8$ therefrom. In response to the signals $S_7$ and $S_9$, the comparator 110 outputs a binary signal which is high when the voltage of the signal $S_7$ exceeds the voltage of the signal $S_9$ and which is low otherwise. The resulting output of the comparator 110 is in the form of a constant frequency pulse train, provided that the voltage of the signal $S_7$ remains between the minimum and maximum levels of the signal $S_9$. The waveform of the signal $S_9$ is designed so that the duty cycle of the output of the comparator 110 can increase linearly with the voltage of the signal $S_7$. In response to the signals $S_8$ and $S_9$, the comparator 112 outputs a similar binary signal which is high when the voltage of the signal $S_8$ exceeds the voltage of the signal $S_9$ and which is low otherwise. The resulting output of the comparator 112 is in the form of a constant frequency pulse train, provided that the voltage of the signal $S_8$ remains between the minimum and maximum levels of the signal $S_9$. Similarly, the duty cycle of the output of the comparator 112 can increase linearly with the voltage of the signal $S_8$.

The I/O section 106 includes NPN transistors 116 and 118. The base of the transistor 116 is connected to the output terminal of the comparator 110 via a resistor 120. The collector of the transistor 116 is connected to the positive terminal of a constant voltage source via the control winding of the electromagnetic valve 58 and a resistor 122. The emitter of the transistor 116 and the negative terminal of the constant voltage source are grounded. When the output of the comparator 110 is high, the transistor 116 is conductive, energizing the control winding of the electromagnetic valve 58. When the output of the comparator 110 is low, the transistor 116 is nonconductive, de-energizing the control winding of the electromagnetic valve 58. Energizing the control winding of the electromagnetic valve 58 causes the valve 58 to open. De-energizing the control winding of the electromagnetic valve 58 causes the valve 58 to close. In this case, the combination of the transistor 116 and the constant voltage source acts to produce the control signal $S_1$, which is conducted to the electromagnetic valve 58 via the connection of the electromagnetic valve 58 to the transistor 116 and the constant voltage source. The waveform of the control signal $S_1$ is similar to that of the output of the comparator 110. Thus, the duty cycle of the control signal $S_1$ can increase linearly with the voltage of the signal $S_7$.

The base of the transistor 118 is connected to the output terminal of the comparator 112 via a resistor 124. The collector of the transistor 118 is connected to the positive terminal of a constant voltage source via the control winding of the electromagnetic valve 66 and a resistor 126. The emitter of the transistor 118 and the negative terminal of the constant voltage source are grounded. When the output of the comparator 112 is high, the transistor 118 is conductive, energizing the control winding of the electromagnetic valve 66. When the output of the comparator 112 is low, the transistor 118 is nonconductive, de-energizing the control winding of the electromagnetic valve 66. Energizing the control winding of the electromagnetic valve 66 causes the valve 66 to open. De-energizing the control winding of the electromagnetic valve 66 causes the valve 66 to close. In this case, the combination of the transistor 118 and the constant voltage source acts to produce the control signal $S_2$, which is conducted to the electromagnetic valve 66 via the connection of the electromagnetic valve 66 to the transistor 118 and the constant voltage source. The waveform of the control signal $S_2$ is similar to that of the output of the comparator 112. Thus, the duty cycle of the control signal $S_2$ can increase linearly with the voltage of the signal $S_8$.

The microcomputer system composed of the central processing unit 100, the memories 102 and 104, and the I/O circuit 108 operates in accordance with a program stored in the memory 102 to determine the duty cycles of the control signals $S_1$ and $S_2$ and thus the percentage of exhaust gas recirculated in response to the signals $S_3$, $S_4$, $S_5$, and $S_6$.

Figure 3:
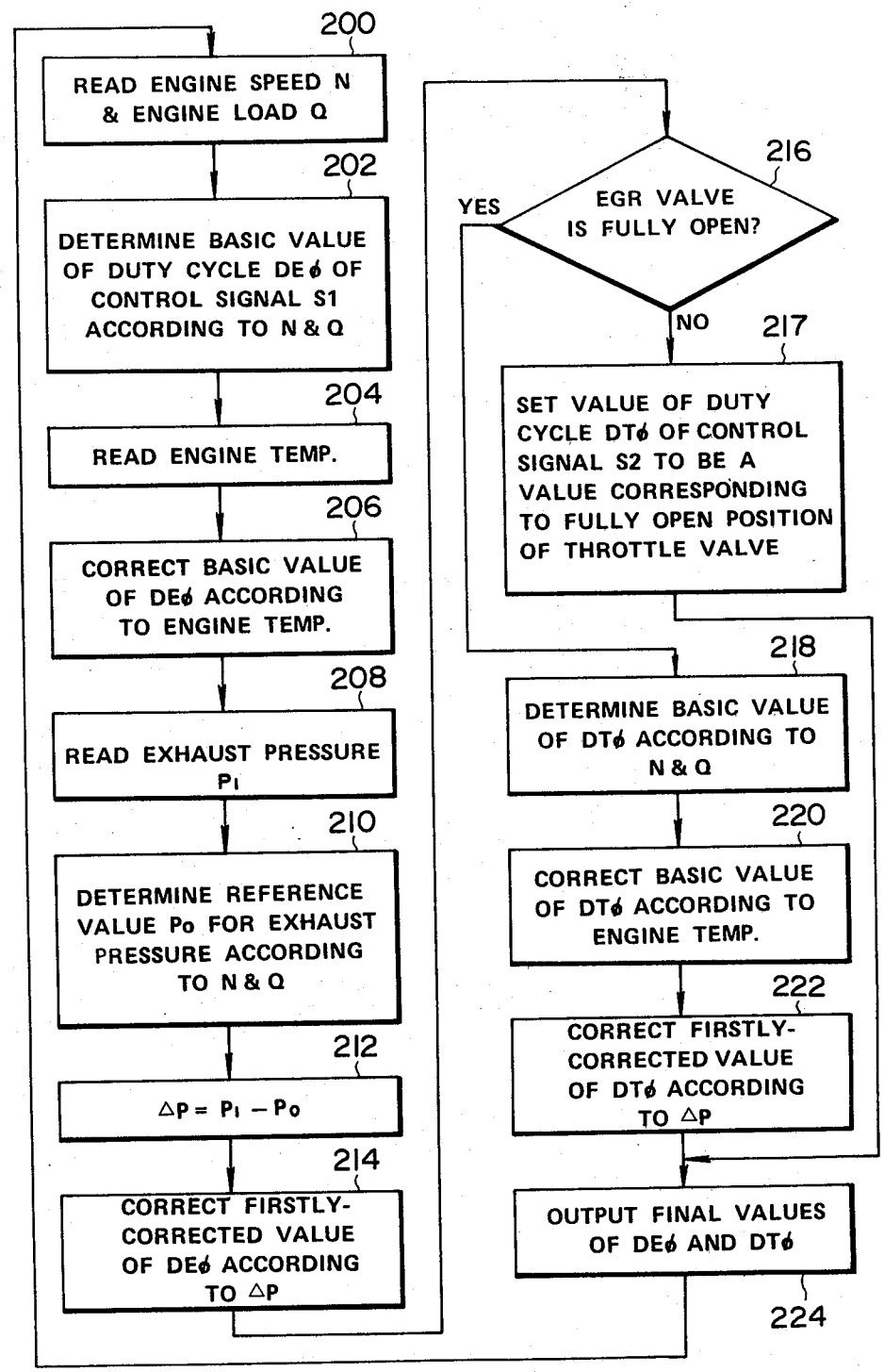
FIG. 3 is a flowchart of the operation of the microcomputer system of FIG. 2.

FIG. 3 is a flowchart of the program executed by the microcomputer system. First, the microcomputer system reads the engine rotational speed N and the engine load Q derived from the signals $S_4$ and $S_5$ outputted by the engine speed sensor 76 and the engine load sensor 78, respectively, in a step 200.

After the step 200, the operation of the microcomputer system proceeds to a step 202, in which the microcomputer system determines a basic desired value of the duty cycle $D_{E\phi}$ of the control signal $S_1$ in accordance with the engine speed N and the engine load Q. In order to determine the basic desired values of the duty cycle $D_{E\phi}$, the microcomputer system refers to a table comprising a set of basic desired valves of the duty cycle $D_{E\phi}$ arranged as a function of the engine speed N and the engine load Q. If necessary, the microcomputer system can perform interpolation in determining the basic desired value of the duty cycle $D_{E\phi}$ by reference to the table. This table is stored in the memory 102.

FIG. 4 shows the relation of the basic desired values of the duty cycle $D_{E\phi}$ to the engine speed N and the engine load Q by means of contour lines. Basically, the basic desired value along the contour line $E_1$ corresponds to the fully open position of the EGR valve 22, while the basic desired value along the contour line En corresponds to the fully closed position of the EGR valve 22. The relation of the basic desired values of the duty cycle $D_{E\phi}$ to the engine speed N and the engine load Q is essentially such that the degree of opening of the EGR valve 22 increases as the engine speed N and the engine load Q approach their middle ranges.

In a step 204 subsequent to the step 202, the microcomputer system reads the engine temperature derived from the signal $S_3$ outputted by the temperature sensor 74.

In a step 206 subsequent to the step 204, the microcomputer system corrects the basic desired value of the duty cycle $D_{E\phi}$ determined by the step 202. The correction is made by using a preset equation, which gives a firstly corrected value of the duty cycle $D_{E\phi}$ in accordance with the basic desired value of the duty cycle $D_{E\phi}$ and the engine temperature. The correction is designed so that the degree of opening of the EGR valve 22 decreases as the engine temperature decreases. The correction can prevent EGR from destabilizing engine operation when the engine temperature is low.

After the step 206, the operation of the microcomputer system proceeds to a step 208, in which the microcomputer system reads a value $P_1$ of the exhaust passage pressure derived from the signal $S_6$ outputted by the pressure sensor 80.

In a step 210 subsequent to the step 208, the microcomputer system determines a reference value $P_0$ for the exhaust passage pressure in accordance with the engine speed N and the engine load Q. In order to determine the reference value $P_0$, the microcomputer system refers to a table comprising a set of reference values $P_0$ for the exhaust passage pressure arranged as a function of the engine speed N and the engine load Q. If necessary, the microcomputer system can perform interpolation in determining the reference value $P_0$ by reference to the table. This table is stored in the memory 102.

FIG. 5 shows the relation of the reference value $P_0$ to the engine speed N and the engine load Q by means of contour lines. The reference value $P_0$ increases in the direction designated by the arrow in FIG. 5. Specifically, the reference value $P_0$ increases linearly with the engine speed N, and increases slightly as the engine load Q increases. The reference value $P_0$ is chosen so as to represent the possible average exhaust passage pressure obtained in the case where no soot or smoke accummulates in the exhaust cleaner 82 (see FIG. 1).

In a step 212 subsequent to the step 210, the microcomputer system calculates the difference $\Delta P$ between the sensed value $P_1$ of the exhaust passage pressure and the reference value $P_0$ thereof by using an equation "$\Delta P = P_1 - P_0$".

In a step 214 subsequent to the step 212, the microcomputer system again corrects the value of the duty cycle $D_{E\phi}$ determined by the step 206. The correction is made by using a preset equation, which gives a secondly corrected value of the duty cycle $D_{E\phi}$ in accordance with the firstly corrected value of the duty cycle $D_{E\phi}$ and the difference $\Delta P$ between the values $P_1$ and $P_2$. The correction is designed so that the degree of opening of the EGR value 22 decreases as the difference $\Delta P$ increases. The correction can compensate for changes in the percentage of exhaust gas recirculated due to changes in the actual exhaust passage pressure, since the increases of the actual exhaust passage pressure can cause the percentage of exhaust gas recirculated to increase.

After the step 214, the operation of the microcomputer system proceeds to a step 216, in which the microcomputer system determines whether or not the EGR valve 22 is fully open in accordance with the secondly corrected value of the duty cycle $D_{E\phi}$ determined by the step 214. When the EGR valve 22 is not fully open, the operation of the microcomputer system proceeds to a step 217. When the EGR valve 22 is fully open, the operation of the microcomputer system proceeds to a step 218.

In the step 217, the microcomputer system determines a desired value of the duty cycle $D_{T\phi}$ of the control signal $S_2$, and more specifically sets the desired value of the duty cycle $D_{T\phi}$ to be a value which corresponds to the fully open position of the throttle value 24. Thus, the throttle valve 24 remains fully open as long as the EGR valve 22 is not fully open.

In the step 218, the microcomputer system determines a basic desired value of the duty cycle $D_{T\phi}$ in accordance with the engine speed N and the engine load Q. In order to determine the basic desired value of the duty cycle $D_{T\phi}$ the microcomputer system refers to a table comprising a set of basic desired values of the duty cycle $D_{T\phi}$ arranged as a function of the engine speed N and the engine load Q. If necessary, the microcomputer system can perform interpolation in determining the basic desired value of the duty cycle $D_{T\phi}$ by reference to the table. This table is stored in the memory 102.

FIG. 6 shows the relation of the basic desired values of the duty cycle $D_{T\phi}$ to the engine speed N and the engine load Q by means of contour lines. Basically, the basic desired value along the contour line $T_1$ corresponds to the minimum position of the throttle value 24, while the basic desired value along the contour line $T_n$ corresponds to the maximum or fully open position of the throttle valve 24. The relation of the basic desired values of the duty cycle $D_{T\phi}$ to the engine speed N and the engine load Q is essentially such that the degree of opening of the throttle valve 24 decreases as the engine speed N and the engine load Q approach their middle ranges.

In a step 220 subsequent to the step 218, the microcomputer system corrects the basic desired value of the duty cycle $D_{T\phi}$ determined by the step 218. The correction is made by using a preset equation, which gives a firstly corrected value of the duty cycle $D_{T\phi}$ in accordance with the basic desired value of the duty cycle $D_{T\phi}$ and the engine temperature. The correction is designed so that the degree of opening of the throttle valve 24 increases as the engine temperature decreases. The correction can prevent EGR from destabilizing engine operation when the engine temperature is low.

In a step 222 subsequent to the step 220, the microcomputer system again corrects the value of the duty cycle $D_{T\phi}$ determined by the step 220. The correction is made by using a preset equation, which gives a secondly corrected value of the duty cycle $D_{T\phi}$ in accordance with the firstly corrected value of the duty cycle $D_{T\phi}$ and the difference $\Delta P$ determined by the step 212. The correction is designed so that the degree of opening of the throttle valve 24 increases as the difference $\Delta P$ increases. The correction can compensate for changes in the percentage of exhaust gas recirculated due to changes in the actual exhaust passage pressure, since the increases of the actual exhaust passage pressure can cause the percentage of exhaust gas recirculated to increase.

After the steps 217 and 222, the operation of the micorcomputer system proceeds to a step 224, in which the microcomputer system writes the secondly corrected value of the duty cycle $D_{E\phi}$ determined by the step 214 in a first register in the I/O circuit 108 and also writes the secondly corrected value of the duty cycle $D_{T\phi}$ determined by either the step 217 or the step 222 in a second register in the I/O circuit 108. The output terminal of the first register is connected to the input terminal of a first digital-to-analog (D/A) converter in the I/O circuit 108. In response to the output from the first register, the first D/A converter outputs a voltage which is proportional to the value in the first register. The output terminal of the first D/A converter is connected to the second input terminal of the comparator 110 (see FIG. 2) to supply the voltage output therefrom to the second input terminal of the comparator 110 as the signal $S_7$. The output terminal of the second register is connected to the input terminal of a second D/A converter in the I/O circuit 108. In response to the output from the second register, the second D/A converter outputs a voltage which is proportional to the value in the second register. The output terminal of the second D/A converter is connected to the second input terminal of the comparator 12 (see FIG. 2) to supply the voltage output therefrom to the second input terminal of the comparator 112 as the signal $S_8$.

After the step 224, the operation of the microcomputer system returns to the step 200, so that the microcomputer system executes a series of the above-mentioned steps repeatedly. In this case, the first and second registers in the I/O circuit 108 hold the secondly corrected values of the duty cycles $D_{E\phi}$ and $D_{T\phi}$ respectively until they are updated.

Typical operation of the overall EGR system is as follows: in the case where the percentage of exhaust gas recirculated is relatively small, only the EGR valve 22 is adjusted to determine the percentage of exhaust gas recirculated while the throttle valve 24 remains fully opened. In this case, the throttle valve 24, therefore, does not obstruct the fresh air supply to the combustion chambers 12.

In the case where the percentage of exhaust gas recirculated is relatively great, only the throttle valve 24 is adjusted to determine the percentage of exhaust gas recirculated while the EGR valve 24 remains fully opened. When the degree of opening of the throttle valve 24 is minimal and that of opening of the EGR valve 22 is maximal, the percentage of exhaust gas recirculated becomes maximal.

As the engine 14 ages, the amount of soot or smoke accummulating in the exhaust cleaner 82 increases and thus the exhaust cleaner 82 is choked therewith. The choked exhaust cleaner 82 causes an increase in the average or mean pressure in the exhaust passage 18 upstream thereof. This pressure increase results in a rise in the average or mean pressure across the EGR valve 24, causing an increase in the percentage of exhaust gas recirculated when the EGR valve 24 is in a fixed open position. In response to the signal $S_6$ from the pressure sensor 80, the control unit 72 corrects the position of the EGR valve 22 or the throttle valve 24 in such a manner that the degree of opening of the EGR valve 22 decreases or that of opening of the throttle valve 24 increases as the average or mean pressure in the exhaust passage 18 upstream of the exhaust cleaner 82 rises. Therefore, this correction can compensate for or offset the increase of the percentage of exhaust gas recirculated due to the increase of the average or mean pressure in the exhaust passage 18 upstream of the exhaust cleaner 82.

Figure 7:
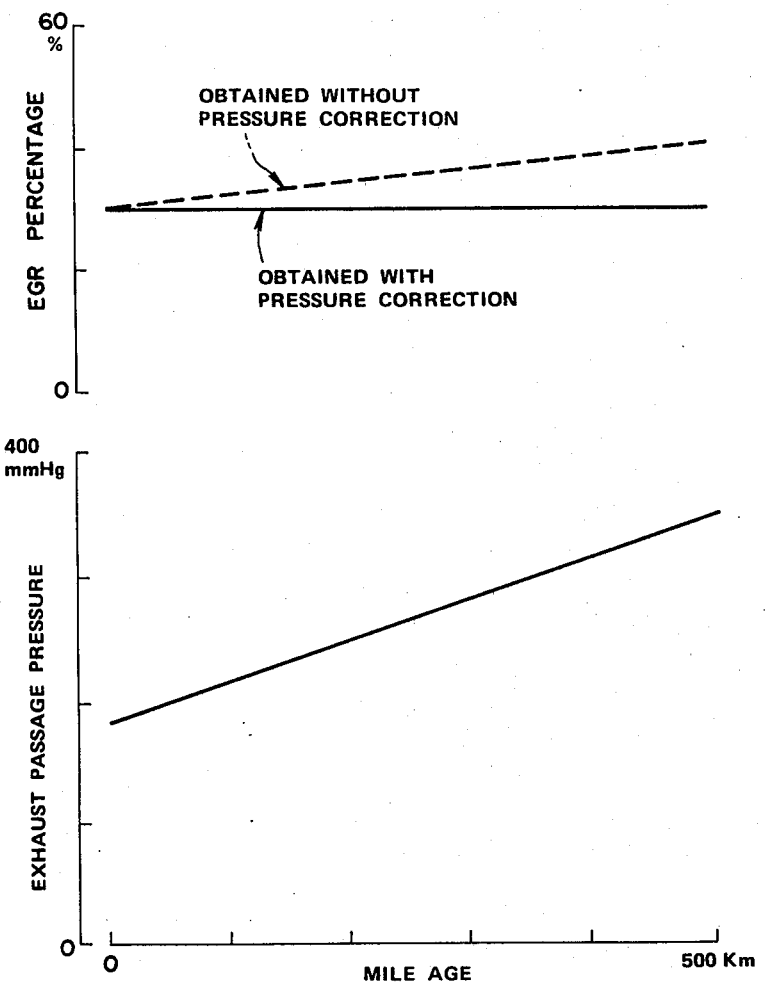
FIG. 7 is a diagram showing the relationship between the percentage of the exhaust gas recirculated and the mileage of a vehicle powered by the engine of FIG. 1.

FIG. 7 shows the relationship between the average or mean pressure in the exhaust passage 18 upstream of the exhaust cleaner 82 and the mileage of a vehicle powered by the engine 10, and that between the percentage of exhaust gas recirculated and the mileage of the vehicle under conditions where the engine rotational speed is 2000 rpm and the engine torque output representing the engine load is 3 kg·$^m$. As shown by the solid lines, the percentage of exhaust gas recirculated under the fixed engine operating conditions is held constant even as the exhaust passage pressure rises with the mileage. In FIG. 7, the broken line indicates the percentage of exhaust gas recirculated under the fixed engine operating conditions in the case where no correction is made to the position of the EGR valve 22 or the throttle valve 24 in response to variations in the average exhaust passage pressure.

Figure 8:
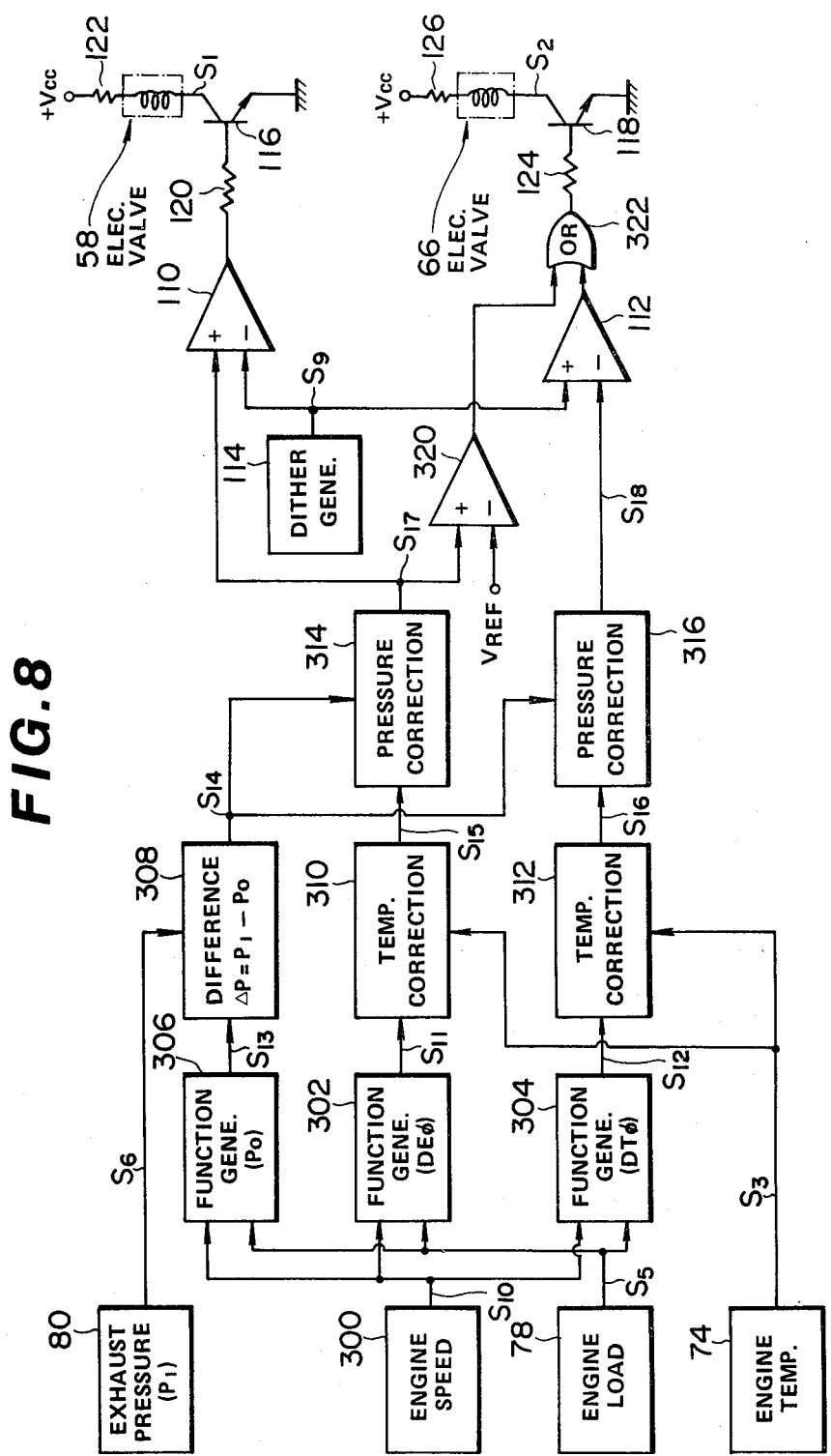
FIG. 8 is a diagram of an essential portion of an exhaust gas recirculation system according to a second embodiment of this invention.

FIG. 8 shows an EGR system according to a second embodiment of this invention, which is designed to operate in a manner similar to that of the first embodiment but which is structurally different, as described below. This EGR system includes an engine speed sensor 300. The speed sensor 300 includes the combination of a toothed disc and a magnetic pickup designed in a manner similar to that of the speed sensor 76 of the first embodiment. The speed sensor 300 also includes a frequency-to-voltage (F/V) converter, whose input terminal is connected across the magnetic pickup to receive the alternating voltage across the magnetic pickup. The frequency of the alternating voltage is proportional to the engine rotational speed. In response to the alternating voltage, the F/V converter generates a voltage signal $S_{10}$ whose level is proportional to the frequency of the alternating voltage and thus to the engine rotational speed.

The first input terminal of a function generator 302 is connected to the output terminal of the F/V converter of the speed sensor 300 to receive the engine speed signal $S_{10}$. The second input terminal of the function generator 302 is connected to the output terminal of the engine load sensor 78 to receive the engine load signal $S_5$. In response to the signals $S_5$ and $S_{10}$, the function generator 302 generates a voltage signal $S_{11}$ whose level varies as a function of the engine speed and the engine load. The function generator 302 is designed so that the level of the signal $S_{11}$ indicates a basic desired value of the duty cycle $D_{E\phi}$ of the control signal $S_1$ which varies as a function of the engine speed and the engine load in a way similar to that of the first embodiment.

The first input terminal of a function generator 304 is connected to the output terminal of the F/V converter of the speed sensor 300 to receive the engine speed signal $S_{10}$. The second imput terminal of the function generator 304 is connected to the output terminal of the engine load sensor 78 to receive the engine load signal $S_5$. In response to the signals $S_5$ and $S_{10}$, the function generator 304 generates a voltage signal $S_{12}$ whose level varies as a function of the engine speed and the engine load. The function generator 304 is designed so that the level of the signal $S_{12}$ indicates a basic desired value of the duty cycle $D_{T\phi}$ of the control signal $S_2$ which varies as a function of the engine speed and the engine load in a way similar to that of the first embodiment.

The first input terminal of a function generator 306 is connected to the output terminal of the F/V converter of the speed sensor 300 to receive the engine speed signal $S_{10}$. The second input terminal of the function generator 306 is connected to the output terminal of the engine load sensor 78 to receive the engine load signal $S_5$. In response to the signals $S_5$ and $S_{10}$, the function generator 306 generates a voltage signal $S_{13}$ whose level varies as a function of the engine speed and the engine load. The function generator 306 is designed so that the level of the signal $S_{13}$ indicates a reference value $P_0$ of the exhaust passage pressure which varies as function of the engine speed and the engine load in a way similar to that of the first embodiment.

The first input terminal of a difference amplifier 308 is connected to the output terminal of the function generator 306 to receive the voltage signal $S_{13}$ indicative of the reference value $P_0$. The second input terminal of the difference amplifier 308 is connected to the output terminal of the pressure sensor 80 to receive the voltage signal $S_6$ indicative of the sensed value $P_1$ of the exhaust passage pressure. In response to the signals $S_6$ and $S_{13}$, the difference amplifier 308 generates voltage signal $S_{14}$ whose level is proportional to the difference $\Delta P$ between the reference value $P_0$ and the sensed value $P_1$, and more specifically to the value $\Delta P$ which equals the sensed value $P_1$ minus the reference value $P_0$.

The first input terminal of a temperature correction circuit 310 is connected to the output terminal of the function generator 302 to receive the voltage signal $S_{11}$ indicative of the basic desired value of the duty cycle $D_{E\phi}$. The second input terminal of the correction circuit 310 is connected to the output terminal of the temperature sensor 74 to receive the voltage signal $S_3$ indicative of the engine temperature. The correction circuit 310 consists of a function generator. In response to the signals $S_3$ and $S_{11}$, the correction circuit 310 generates a voltage signal $S_{15}$ whose level varies as a function of the engine temperature and the basic desired value of the duty cycle $D_{E\phi}$. The correction circuit 310 is designed so that the level of the signal $S_{15}$ indicates a firstly corrected value of the duty cycle $D_{E\phi}$ which varies as a function of the engine temperature and the basic desired value of the duty cycle $D_{E\phi}$ in a way similar to that of the first embodiment.

The first input terminal of a temperature correction circuit 312 is connected to the output terminal of the function generator 304 to receive the voltage signal $S_{12}$ indicative of the basic desired value of the duty cycle $D_{T\phi}$. The second input terminal of the correction circuit 312 is connected to the output terminal of the temperature sensor 74 to receive the voltage signal $S_3$ indicative of the engine temperature. The correction circuit 312 consists of a function generator. In response to the signals $S_3$ and $S_{12}$, the correction circuit 312 generates a voltage signal $S_{16}$ whose level varies as a function of the engine temperature and the basic desired value of the duty cycle $D_{T\phi}$. The correction circuit 312 is designed such that the level of the signal $S_{16}$ represents firstly corrected value of the duty cycle $D_{T\phi}$ which varies as a function of the engine temperature and the basic desired value of the duty cycle $D_{T\phi}$ in a way similar to that of the first embodiment.

The first input terminal of a pressure correction circuit 314 is connected to the output terminal of the temperature correction circuit 310 to receive the voltage signal $S_{15}$ indicative of the firstly corrected value of the duty cycle $D_{E\phi}$. The second input terminal of the correction circuit 314 is connected to the output terminal of the difference amplifier 308 to receive the voltage signal $S_{14}$ indicative of the difference $\Delta P$. The correction circuit 314 consists of a function generator. In response to the signals $S_{14}$ and $S_{15}$, the correction circuit 314 generates a voltage signal $S_{17}$ whose level varies as a function of the difference $\Delta P$ and the firstly corrected value of the duty cycle $D_{E\phi}$. The correction circuit 314 is designed such that the level of the signal $S_{17}$ represents secondly corrected value of the duty cycle $D_{E\phi}$ which varies as a function of the difference $\Delta P$ and the firstly corrected value of the duty cycle $D_{E\phi}$ in a way similar to that of the first embodiment. The signal $S_{17}$ is thus identical to the signal $S_7$ of the first embodiment.

The first input terminal of a pressure correction circuit 316 is connected to the output terminal of the temperature correction circuit 312 to receive the voltage signal $S_{16}$ indicative of the firstly corrected value of the duty cycle $D_{T\phi}$. The second input terminal of the correction circuit 316 is connected to the output terminal of the difference amplifier 308 to receive the voltage signal $S_{14}$ indicative of the difference $\Delta P$. The correction circuit 316 consists of a function generator. In response to the signals $S_{14}$ and $S_{16}$, the correction circuit 316 generates a voltage signal $S_{18}$ whose level varies as a function of the difference $\Delta P$ and the firstly corrected value of the duty cycle $D_{T\phi}$. The correction circuit 316 is designed such that the level of the signal $S_{18}$ represents secondly corrected value of the duty cycle $D_{T\phi}$ which varies as a function of the difference $\Delta P$ and the firstly corrected value of the duty cycle $D_{T\phi}$ in a way similar to that of the first embodiment. The signal $S_{18}$ is thus identical to the signal $S_8$ of the first embodiment.

The triangular-wave or dither signal generator 114 and the comparators 110 and 112 are connected and designed in a manner similar to that of the first embodiment. The second input terminal of the comparator 110 is connected to the output terminal of the pressure correction circuit 314 to receive the voltage signal $S_{17}$ indicative of the secondly corrected value of the duty cycle $D_{E\phi}$. In response to the voltage signal $S_{17}$ and the triangular-wave signal $S_9$ from the generator 114, the comparator 110 outputs a binary signal, which is high when the voltage of the signal $S_{17}$ exceeds the voltage of the signal $S_9$ and which is low otherwise. In this case, the duty cycle of the resulting output of the comparator 110 is equal to the value of the duty cycle $D_{E\phi}$ indicated by the signal $S_{17}$. The comparator 110, the transistor 116, the resistors 120 and 122, the control winding of the electromagnetic valve 58, and the constant voltage source are connected and designed in a manner similar to that of the first embodiment. Thus, the duty cycle of the control signal $S_1$ is adjusted so as to be equal to the secondly corrected value indicated by the signal $S_{17}$.

The second input terminal of the comparator 112 is connected to the output terminal of the pressure correction circuit 316 to receive the voltage signal $S_{18}$ indicative of the secondly corrected value of the duty cycle $D_{T\phi}$. In response to the voltage signal $S_{18}$ and the triangular-wave signal $S_9$ from the generator 114, the comparator 112 outputs a binary signal, which is high when the voltage of the signal $S_{18}$ exceeds the voltage of the signal $S_9$ and which is low otherwise. In this case, the duty cycle of the resulting output of the comparator 112 is equal to the value of the duty cycle $D_{E\phi}$ indicated by the signal $S_{18}$.

The first input terminal of a comparator 320 is supplied with a reference voltage $V_{REF}$. The second input terminal of the comparator 320 is connected to the output terminal of the pressure correction circuit 314 to receive the voltage signal $S_{17}$ indicative of the secondly corrected value of the duty cycle $D_{E\phi}$. In response to the reference voltage $V_{REF}$ and the signal $S_{17}$, the comparator 320 outputs a binary signal, which is high when the voltage of the signal $S_{17}$ exceeds the reference voltage $V_{REF}$ and which is low otherwise. The reference voltage $V_{REF}$ is chosen so that the output of the comparator 320 is low only when the voltage of the signal $S_{17}$ is in a range corresponding to the fully open condition of the EGR valve 22 (see FIG. 1). In other words, the output of the comparator 320 is high when the voltage of the signal $S_{17}$ is in the range corresponding to the fully closed or only partially open condition of the EGR valve 22.

The first input terminal of an OR gate 322 is connected to the output terminal of the comparator 320 to receive the output therefrom. The second input terminal of the OR gate 322 is connected to the output terminal of the comparator 112 to receive the output therefrom. The output terminal of the OR gate 322 is connected to the base of the transistor 118 via the resistor 124. The resistors 124 and 126, the transistor 118, the control winding of the electromagnetic valve 66, and the constant voltage source are connected and designed in a manner similar to that of the first embodiment.

When the output of the comparator 320 is low and thus the EGR valve 22 is fully open, the output of the comparator 112 is transmitted as it is to the transistor 118. In this case, the duty cycle of the control signal $S_2$ is adjusted so as to be equal to the secondly corrected value indicated by the signal $S_{18}$. When the output of the comparator 320 is high and thus the EGR valve 22 is fully closed or partially open, the output of the OR gate 322 remains high regardless of the output of the comparator 112. Since the high level output of the OR gate 322 is transmitted to the transistor 118, the transistor 118 remains conductive and energizes the control winding of the electromagnetic valve 66 in this case. Therefore, when the EGR valve 22 is fully closed or partially open, the throttle valve 24 (see FIG. 1) is forcedly fully open regardless of the signal $S_{18}$ or the output of the comparator 112.

It should be understood that further modifications and variations may be made to this invention without departing from the spirit and scope of this invention as set forth in the appended claims. For example, corrections to the position of the throttle valve 24 in accordance with the exhaust passage pressure increase can be eliminated. In this case, there need only be the correction to the position of the EGR valve 22 in accordance with the exhaust passage pressure increase.

Additionally, the pressure sensor 80 may be arranged to detect the pressure in the EGR passage 20 upstream of the EGR valve 22. Since the EGR passage 20 upstream of the EGR valve 22 directly and freely communicates with the exhaust passage 18 upstream of the exhaust cleaner 82, the pressures therein are essentially equal. Therefore, the output of the pressure sensor 80 would essentially indicate the pressure in the exhaust passage 18 upstream of the exhaust cleaner 82 even in this case.

What is claimed is:

1. An exhaust gas recirculation system for an internal combustion engine having a combustion chamber and an exhaust passage, the exhaust passage extending from the combustion chamber to the atmosphere so as to conduct exhaust gas from the combustion chamber to the atmosphere, the exhaust gas recirculation system comprising:
   (a) first means for directing the exhaust gas back to the combustion chamber to recirculate the exhaust gas through the combustion chamber;
   (b) second means, associated with the first means, for controllably determining the percentage of the exhaust gas recirculated;
   (c) third means for sensing the average pressure in the exhaust passage; and
   (d) fourth means, responsive to the sensed exhaust pressure, for controlling the second means in such a manner that the percentage of the exhaust gas recirculated is independent of variations in the average pressure in the exhaust passage.

2. An exhaust gas recirculation system as recited in claim 1, wherein the first means comprises:
   (a) an air intake passage leading to the combustion chamber to conduct fresh air to the combustion chamber; and
   (b) an exhaust gas recirculation passage connecting the exhaust passage and the air intake passage;
wherein the second means comprises:
   (c) an exhaust gas recirculation valve for controlling the effective cross-sectional area of the exhaust gas recirculation passage;
and wherein the fourth means controls the exhaust gas recirculation valve in response to the sensed exhaust pressure in such a manner as to reduce the effective crosssectional area of the exhaust gas recirculation passage as the sensed exhaust pressure increases.

3. An exhaust gas recirculation system as recited in claim 2, wherein the second means further comprises a throttle valve controllably arranged in the air intake passage upstream of the connection with the exhaust gas recirculation passage, and wherein the fourth means controls the throttle valve in such a manner as to increase the degree of opening of the throttle valve as the sensed exhaust pressure increases.

4. An exhaust gas recirculation system as recited in claim 2, further comprising an exhaust cleaner disposed in the exhaust passage downstream of the connection with the exhaust gas recirculation passage for removing soot and smoke from the exhaust gas flowing therethrough, and wherein the third means senses the average pressure in the exhaust passage upstream of the exhaust cleaner.

5. An exhaust gas recirculation system as recited in claim 1, further comprising fifth means for sensing an operating condition of the engine, and wherein the fourth means controls the second means in response to the sensed engine condition so as to adjust the percentage of the exhaust gas recirculated in accordance with the sensed engine condition.

6. An exhaust gas recirculation system as recited in claim 5, wherein the fifth means senses the rotational speed of the engine.

7. An exhaust gas recirculation system as recited in claim 5, wherein the fifth means senses the load on the engine.

8. An exhaust gas recirculation system as recited in claim 5, wherein the fifth means senses the temperature of the engine.

9. An exhaust gas recirculation system as recited in claim 1, further comprising fifth and sixth means for sensing different two operating conditions of the engine respectively, and wherein the fourth means controls the second means in response to the sensed engine conditions so as to adjust the percentage of the exhaust gas recirculated in accordance with the sensed engine conditions.

10. An exhaust gas recirculation system as recited in claim 9, wherein the fifth and sixth means senses the rotational speed of the engine and the load on the engine respectively.

* * * * *